J. M. W. KITCHEN.
APPARATUS FOR TREATING REFUSE MATERIAL.
APPLICATION FILED MAR. 1, 1910.
1,063,886.
Patented June 3, 1913.
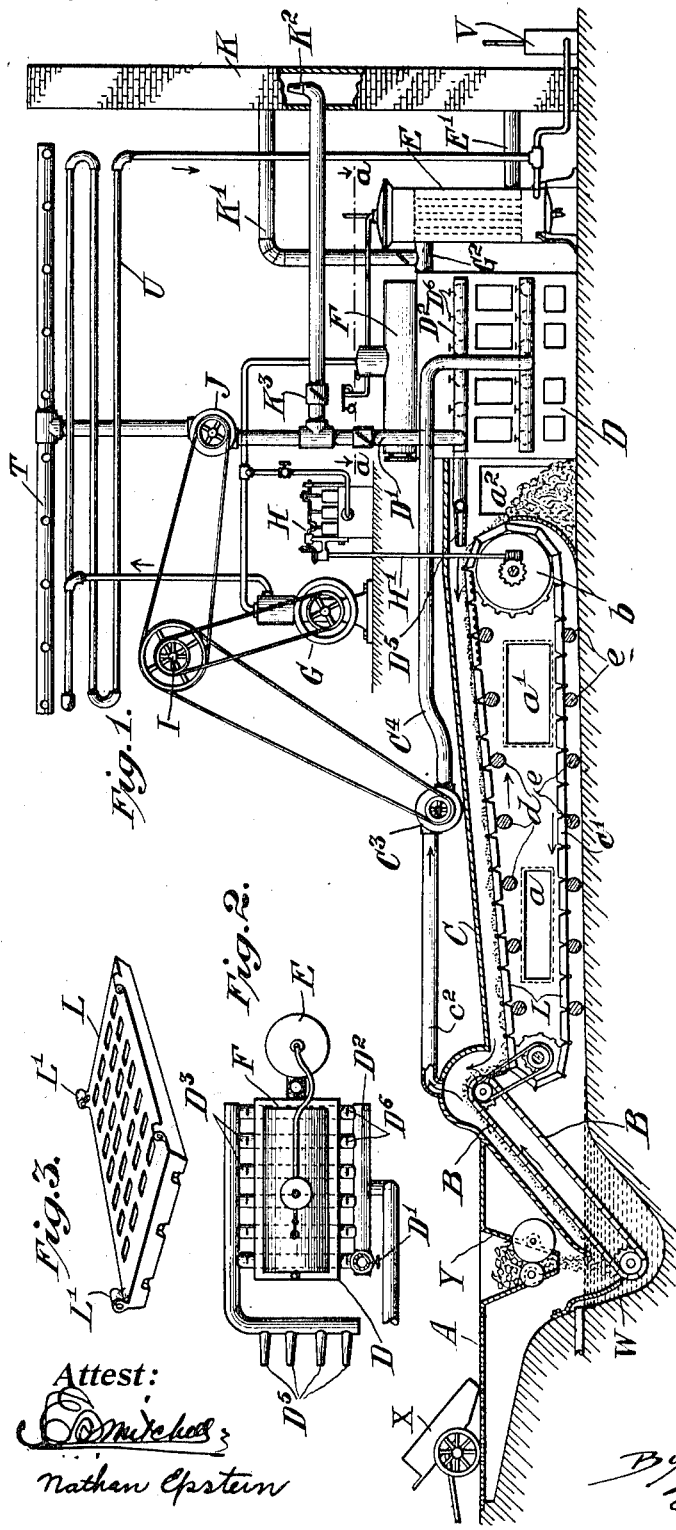
Attest:
Nathan Epstein
Inventor:
J. M. W. Kitchen
By Geo. S. Wheelock Atty.

UNITED STATES PATENT OFFICE.

JOSEPH MOSES WARD KITCHEN, OF EAST ORANGE, NEW JERSEY.

APPARATUS FOR TREATING REFUSE MATERIAL.

1,063,886.     Specification of Letters Patent.     Patented June 3, 1913.

Application filed March 1, 1910. Serial No. 546,585.

*To all whom it may concern:*

Be it known that I, JOSEPH MOSES WARD KITCHEN, a citizen of the United States, residing at East Orange, county of Essex, and State of New Jersey, have invented certain new and useful Improvements in Apparatus for Treating Refuse Material, of which the following is a clear, full, and exact description.

It is well known that there is an enormous aggregate waste continually occurring in towns and cities in connection with the disposition of such material as unconsumed fuel, garbage, paper and other burnable carbonaceous substances.

The object of this invention is to provide for an economical disposition of some of such refuse materials.

In a previous application for patent I have shown and described a method for the utilization of unconsumed fuel reclaimed from ashes.

The present invention pertains especially to the ultization of garbage.

As is well known the garbage of towns is mostly composed of such constituents as bone, meat, bread scraps, butter and other fats, vegetable peelings and other matters having more or less food values, or value for fertilizing purposes. In my invention I provide for the drying and sterilization of these materials; or if desired, for their complete burning, and for their pulverization or comminution to a suitable and convenient condition, so that they can be packed, transported and distributed for use, either as animal food, or in case of complete burning, as a basis for making chemical fertilizers. In the treatment of garbage, for economical reasons, such material should be treated at or near to where the garbage is collected; and as that place is usually near to residential sites, provision should be made to avoid the nuisance of objectionable odors and fumes becoming disseminated in the local atmosphere, and to prevent unhygienic contamination of the atmosphere with irrespirable gases. In my invention I provide against the dissemination of the fumes by using the fume contaminated air of the plant as air for combustion in burning fuel in the plant, incidentally decomposing the fumes in the combustion process. I convey or mechanically force the exhaust burned gases produced in the treatment of the garbage, through a tall stack, exhausting the gases at a high level above the plant where the gas is treated, and thus secure a large air dilution of the exhaust gases which are thus largely deprived of properties damaging to health. The practicability of economically utilizing such material largely depends upon the economy of the methods for drying, sterilizing and otherwise handling and preparing them for use, and upon the methods for generating the power necessary to be used in the motor work in connection with the manipulation of these materials. As a basis for such economizing methods I utilize the counter-travel, and especially the horizontal counter-travel principle of drying and heating the materials utilized. The most intense heat generated for the purpose, is used for the most complete and final drying and sterilizing of the materials, while the primary and progressively higher heating of the materials is performed with the heat generated, but which has progressively lost heat as it accomplishes work, the primary heating of the material being performed by the lowest degrees of heat. The principle of the counter-travel heating of the material, may be accomplished in a vertical counter-current travel of the heating gases, they either making an ascending travel or a plunging travel; or, the principle can be carried out in a horizontal travel, which last named method I prefer in this case.

The methods and principles applied in my invention are exemplified diagramatically in the accompanying drawings, in which:

Figure 1 represents in elevation, and partly in section, a device which is specially designed to dry, sterilize and comminute garbage, and to prepare that material as a food for farm animals. Fig. 2 represents a plan view of part of the device, it being taken on the line *a—a*, Fig. 1. Fig. 3 represents on an enlarged scale a carrier plate comprised in the traveling conveyer used in the device illustrated in Fig. 1.

A is a perforated platform on which garbage is dumped.

B is an elevating carrier.

C is a drier.

D is a furnace for burning paper and other combustible wastes.

E is a water heater.

F is a boiler.

G is a steam engine.

H is a multiple cylinder steam motor.

I is a drive shaft with pulleys.
J is an induction and forcing fan.
K is a chimney stack.
L is one of the plates of the traveling conveyer $C^1$.
T is a hot air conduit.
U is heat radiating piping.
V is a pump.
W is a fluid well and seal.
X is a cart.
Y is a grinder.

The elevator B and the conveyer $C^1$ are inclosed in a sheet metal incasement, having the ports $a$ and $a^1$ and the door $a^2$. Through the door $a^2$ the dried refuse is removed and shipped for use, in some cases being finely ground after drying. The conveyer $C^1$ is composed of a number of conveyer plates L, which are joined together by the lugs $L^1$ and suitable bolts. On the bottom of the plates L are recesses which receive the cogs of the drive wheel $b$. The conveyer web is supported at the top by the rollers $d$ and at the bottom by the rollers $e$. These rollers have the ends of their shafts supported by the side plates of the metallic incasement of the drier apparatus. The roofing of the incasement of the conveying device is highest at the end nearest the furnace. This construction retains the hottest gases in that part and the conveyer which travels in a plane sloping upward toward the furnace conveys the material to be dried up into the zone containing the gases of highest heat. The floor under the conveyer slopes toward the well W, draining thereinto any drip from the material on the conveyer.

In operating the device, the garbage is dumped from the cart X on the perforated platform A. The liquid from the garbage is drained through the platform and runs into the well W, the water seal of which prevents fumes from being blown from the incasement of the drier from the material. The fumes are forced through the inlet of the conduit $C^2$ by the blast from the twyers $D^5$. The garbage is spread out on the platform, and tin cans, glass ware and other matter extraneous to the garbage is separated from it. The garbage is then fed into the grinder Y, which crushes the bones and otherwise comminutes the garbage to a size which secures a quick and uniform drying of the garbage, which, falling down upon the elevator B is carried upward and is precipitated on the carrier $C^1$. This carrier is given a definite speed of travel in the direction indicated by the arrow by means of the motor H, operating through the bevel and worm gear $H^1$. As the garbage is carried toward the furnace D, it meets a blast of hot air, which is drawn from a high level in the building housing the plant, through the air conduit T by the induction and forcing fan J which forces the air successively through the conduit $D^1$, the header $D^2$, the heating pipes $D^3$, and the twyers $D^5$. The heating pipes $D^3$ are of cast iron, and are built in the masonry work of the furnace D. The dampers $D^6$ regulate the amount of air passing through either one of these heater pipes. The pipes are heated by the burning of wooden boxes, barrels, paper, or other combustible matter in the furnace D, and the heat of the air blast emerging from the twyers $D^5$ is controlled by the volume of air allowed to pass through the damper controlled conduit $D^1$. The hot air is blown through the drier part of the device in counter-current to the travel of the garbage, which is consequently progressively heated, dried and sterilized. The formation of the upper incasement of the device C provides through the upwardly buoyant effect of gravity for the maintenance of a stratum of the hottest gases at a high level in the drier. As these gases cool they are drawn out by the action of the fan $C^3$ through the conduit $c^2$, and forced through the conduit $C^4$ to the air for combustion feeding device of the furnace D. The gases carrying moisture and fumes from the drying garbage are forced through the burning material in the furnace D, thus decomposing and deodorizing organic matter in the gases. The furnace D has a plurality of fuel burning compartments, one or more of which may be operated independent of the others.

The gases pass out of the furnace D through the gas exit $G^2$ into the upper part of the water heater E, and are drawn downwardly through the water heater E out through the gas exit $E^1$ and are exhausted through the stack K. When it is desired to have a direct draft for the gases from the furnace into the stack K, the gases are allowed to pass through the damper controlled conduit $K^1$. The draft in the stack K can be increased by the injection of air forced by the fan J through the injection device $K^2$, controlled by the damper $K^3$. Feed water and water of condensation are fed into the water heater E by the pump V, and by gravitating from the radiating pipe U. The water, as it is progressively heated in its upward passage through the device E is pumped over into the boiler F, and becomes therein converted into steam which is used to operate the steam engine G and the motor H.

In the construction of the drier, in order to prevent emission of fumes, provision is made to prevent the passage of gases through the walls of the drier, except through the special conduits for heated air, and at the exit for fume laden air. The door $A^2$ is arranged for a tight closure, and the water seal in the pit W prevents entrance of air or emission of fumes therethrough. The speed of the blower $C^3$ is maintained at a rate to maintain an induced draft continually in the drier. The installation is housed in a building in which any fumes emanating from the garbage are caught at a high level in the building, and drawn downwardly, and finally used as air for combustion; the fumes being decomposed and deodorated by the heat of the furnace.

A number of details which would necessarily be included in plants of this kind are not indicated in the drawings. It is obvious that other structures can be used for carrying out the principles of my invention.

The basic idea underlying the invention is to economize heat in such a manner in the preparation of town refuse that such refuse may be conveniently and economically treated. It will be observed that the principle is applied in heating processes in the plant, of providing work for heat of low degrees, which heat of low degrees is capable of performing, and of reserving work to be done by heat of high intensity, which high heat alone is capable of performing. It will be seen that in utilizing the heat of radiation, the principle is adopted of progressively heating air for use in the plant, first with low degrees of heat and finally with higher degrees of heat.

The provision shown for conveying the exhaust steam from the engine G to a high level of the radiating pipes U, and then gradually bringing the condensing steam in a downward travel to lower zones, indicates the general principle adopted of progressively heating the air for the uses of combustion or heating.

It will be obvious that in comminuting the garbage in the grinder Y while the garbage is in a moist condition, a complete dust like pulverization of the garbage by that device would not be practical. Hence in those cases in which a finely pulverized product is desired, a secondary grinding of the garbage after it is dried would be necessary.

Subject matter is herein disclosed which is not herein claimed, but which is more or less claimed in my co-pending application Serial No. 725,199, filed October 11th, 1912.

What I claim as new is:

1. The combination of (1) means comprising a furnace for heating a heating and sterilizing gas and for forcing a blast of said heating gas, (2) means for comminuting the material commonly known as garbage, (3) means comprising a casing having an inlet and an outlet and also a conveyer for conveying garbage from said inlet to said outlet, said casing being constructed for securing the travel of the blast of heating gas from said furnace through said outlet to said inlet in intimate contact with said garbage and in counter direction to the travel of the garbage, and (4) means for controlling the temperature of the blast of heating gas.

2. The combination of (1) means for separating water from garbage and for facilitating the separation from the garbage of solid material foreign to the garbage, (2) a furnace for heating a drying and sterilizing gas, (3) a drier comprising a casing having an inlet to admit said garbage and a traveling conveyer for conveying said garbage in one direction from said inlet toward said furnace, and (4) means for forcing a flow of the heated gas from said furnace in contact with said garbage and in counter direction to the travel of said garbage, said drier being connected with an exhaust stack exhausting burned gases and fumes at a high level above said drier, whereby the exhaust gases are highly diluted with air at said high level.

3. The combination of (1) a sorting and water separating platform on which to dump refuse material, (2) a drier for drying said material, (3) means for conveying said material from said platform to said drier, said drier comprising a traveling water percolating perforated web-sustainer for the material, moving horizontally in a direction away from the platform, and which also comprises a casing adapted to bring hot gases in close contact with said material disposed in a thin horizontally laid stratum on said web, and (4) means for generating and injectively inducing a blast of hot gases through said drier in contact with said material and in a direction counter to the direction in which the material is conveyed.

4. The combination of (1) means for separating fluid from refuse, (2) a comminutor for comminuting the refuse, (3) a pit for receiving the comminuted refuse, said pit comprising means for maintaining a definite water level in the pit for preventing undesired emergence of gases and fumes from said pit, said pit being connected with a drier, (4) said drier for drying and sterilizing said refuse, the said drier comprising a traveling conveyer and also comprising an incasement for the conveyer impervious to gases except at the end of the incasement farthest from the end in which the refuse enters the drier and except at an exit for the drying gases exhausted from the drier, (5) means for conveying the refuse from said pit to said conveyer, (6) means for giving a horizontally traveling motion to said conveyer and for controlling the rate of motion of the conveyer, (7) a furnace for burning refuse and heating gases, (8) means for injecting currents of said heating gases over and in contact with the refuse, and (9) blower and exhausting fans and connecting conduits for forcing the heated gases through said drier and for exhausting the gases from the drier and conveying the gases through a zone of intense heat, whereby constituent organic matter in the exhaust gases is decomposed and deodorized.

5. The combination of (1) an endless conveyer for conveying, drying and highly heating organic refuse, (2) means comprising an air blower, an exhaust stack and an injection device in said stack for producing a flow of hot gases over and in contact with refuse on the conveyer, (3) means for generating heat for heating said hot gases, and (4) means for uniting the hot gases and fumes from the highly heated refuse and for conveying the heated gases and fumes to said injection device, and other means for forcing a controlled amount of said hot gases into contact with said refuse through the operation of said last named means.

6. The combination of (1) an endless conveyer for conveying, drying and highly heating organic refuse, (2) means comprising an air blower and an exhaust stack and an injection device in said stack for producing a flow of hot gases over and in contact with refuse on the conveyer, (3) means for generating heat for heating said hot gases, and (4) means for uniting the hot gases and fume laden gases heated by the heat of the highly heated refuse and for conveying the heated gases to said injection device and other means for forcing a controlled amount of said hot gases into contact with said refuse through the operation of said last named means.

7. The combination of (1) a conveying drier for conveying, drying and highly heating organic refuse, (2) means comprising an air blower and an exhaust stack and a device in said stack for producing a flow of hot gas in, and in contact with, the refuse in the drier; (3) means for generating heat for heating the gas; (4) means for uniting the hot gas and fumes from the refuse and for conveying the heated gas to said exhaust stack, and (5) means for forcing a controlled amount of said hot gas into contact with said refuse.

8. The combination of (1) means for separating water and facilitating the sorting of undesired foreign matters from refuse material, (2) a drier, said means being at a level above and connected with said drier for drying the material, and said drier comprising a perforated, counter travel, horizontally moving, conveyer web providing for the drip of fluid through said web from the material on said web, (3) a heating furnace at the end of the conveyer web and toward which furnace the material is conveyed, and (4) means between the furnace and conveyer web to receive the dried material from the web, said receiving means keeping the dried material separate from the solid products of combustion formed in said furnace.

9. The combination of (1) a drier, said drier comprising an incasement impervious to gases except at a gas exit for exhaust gases and at an exit for the material dried, said drier having a small vertical height at the end of the drier where the material to be dried is introduced and a larger vertical height at the end to which the dried material is conveyed, said last named end forming a concavity in which hot gases are horizontally retained, said drier comprising a traveling conveying web for conveying the material, said drier comprising a sloping floor for draining away fluid dripped from the material dried, said web moving endlessly around end wheels and being supported by rollers in the endless travel of the web, (2) a furnace for heating gases, the gases being used to dry the material treated, (3) mechanical means for forcing the drying gases through the furnace and through the incasement, (4) an exhaust exit for the gases at the end of the drier farthest from the furnace, and (5) means located at or near the exit for exhaust gases for feeding the material to be dried onto said conveying web.

10. The combination of (1) a refuse drier, said drier comprising a traveling conveyer, said conveyer being adapted for conveying a thin layer of refuse in a plane slightly inclined upward from a horizontal plane from a lower level to a higher level, and said casing being adapted for collecting gases of high heat at said high level, whereby said refuse is dried and sterilized by a volume of hot gases, which hot gases are thereby first first brought into contact with the refuse at said higher level and then progressively at lower levels, the gases as they lose heat progressively being brought into contact with refuse of lower temperatures, (2) means for heating the gases for drying the refuse and for forcing and inducing the gases through said drier, (3) means for controlling the temperature of the gases heated, and for controlling the amount of heat applied to the refuse while in the drier, and (4) means whereby the refuse may be removed from the drier in a dry and sterilized but unburned condition and for preventing the burning of said refuse.

11. The combination of (1) a drier, (2) a furnace for heating gases for drying material in the drier, said drier having a conveyer for conveying the material from one end to the other end which is nearest the furnace, said drier being incased and having an inclined roofing to the incasement with its highest part near the furnace, said conveyer having its upper surface traveling in a plane sloping from a lower level up to a higher level at or near to the highest part of the roof of the incasement, and (3) means for securing a draft of hot gases from the furnace through the drier from the part nearest the furnace to the opposite end, the material being dried traveling in counter direction to the travel of the drying gases.

12. The combination with a drier of (1) means for separating water from refuse by gravitating the water into a pit, (2) said pit for receiving the water, said pit comprising an overflow for the water and a water seal for preventing gases entering or leaving the drier through said pit and through said drier which is connected with the pit, and (4) means for maintaining an induced draft in said drier.

13. The combination of (1) a drier for drying refuse material, (2) a furnace for heating gases for drying the material, and (3) means for forcing the heated gases through the drier, said drier comprising a conveyer traveling in a plane upward from its receiving end to its delivery end, and also comprising a casing inclosing said conveyer, the part of said casing above said conveyer being inclined to substantially correspond with the inclination of said conveyer, said conveyer being arranged in juxtaposition to said casing part of the conveyer to provide for a thin stratum of heated air and gases being brought into intimate contact with the material spread on said conveyer, and said casing being constructed and arranged to receive and retain at its highest level the hottest gases forced through said casing.

Signed at New York, N. Y., this 28th day of February, 1910.

JOSEPH MOSES WARD KITCHEN.

Witnesses:
GEO. L. WHEELOCK,
BEATRICE MIRVIS.